(12) United States Patent
Lobana et al.

(10) Patent No.: US 9,460,472 B2
(45) Date of Patent: *Oct. 4, 2016

(54) SYSTEM AND METHOD FOR RECONCILING ONE OR MORE FINANCIAL TRANSACTIONS

(71) Applicant: III HOLDINGS 1, LLC, Wilmington, DE (US)

(72) Inventors: Preeti Lobana, New Delhi (IN); Ruchika Arun, New Delhi (IN); Kizhakkemadam R. Krishnan, Delhi (IN); Uday Rao Kadam, Uttar Pradesh (IN); Raju Vishwanathan, Uttar Pradesh (IN); Shino Joseph, New Delhi (IN); Anurag Dahiya, New Delhi (IN)

(73) Assignee: III Holdings 1, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/183,728

(22) Filed: Feb. 19, 2014

(65) Prior Publication Data

US 2014/0172655 A1  Jun. 19, 2014

Related U.S. Application Data

(63) Continuation of application No. 14/071,323, filed on Nov. 4, 2013, which is a continuation of application No. 11/552,892, filed on Oct. 25, 2006, now Pat. No. 8,600,845.

(51) Int. Cl.
*G07B 17/00* (2006.01)
*G07F 19/00* (2006.01)
(Continued)

(52) U.S. Cl.
CPC ............. *G06Q 40/12* (2013.12); *G06Q 40/00* (2013.01); *G06Q 40/02* (2013.01); *G06Q 40/10* (2013.01); *G06Q 20/10* (2013.01); *G06Q 40/06* (2013.01)

(58) Field of Classification Search
CPC ...... G06Q 40/10; G06Q 40/02; G06Q 40/00; G06Q 20/102; G06Q 20/10
USPC ..... 705/8, 30, 33, 35, 39, 40; 707/618, 752; 717/106, 124, 126
See application file for complete search history.

(56) References Cited

U.S. PATENT DOCUMENTS 4,989,141 A * 1/1991 Lyons ................... G06F 17/246
  705/30
5,093,787 A * 3/1992 Simmons ........... G06Q 20/0425
  235/379

(Continued)

OTHER PUBLICATIONS

USPTO; Notice of Allowance dated Dec. 1, 2011 in U.S. Appl. No. 13/009,528.

(Continued)

*Primary Examiner* — Olusegun Goyea
(74) *Attorney, Agent, or Firm* — Meyertons, Hood, Kivlin, Kowert & Goetzel, P.C.

(57) ABSTRACT

A system, method and computer program product for reconciling one or more financial transactions of one or more business units. The method includes capturing transaction data from the financial transactions using a first set of data logics. The capturing further includes extracting the transaction data from the financial transactions using import templates and transforming the extracted transaction data to a predefined format, using a first set of validations. The captured transaction data is then auto-matched with master data as reference, using one or more auto-match logics and a second set of validations. One or more reports are then generated on the auto-matched transaction data. The method further includes providing user privileges for controlling the capturing, the auto-matching, and the generation of the one or more reports according to a first predefined criterion.

17 Claims, 11 Drawing Sheets

(51) Int. Cl.
  *G06Q 40/00* (2012.01)
  *G06Q 40/02* (2012.01)
  *G06Q 40/06* (2012.01)
  *G06Q 20/10* (2012.01)

(56) References Cited

U.S. PATENT DOCUMENTS

| | | | |
|---|---|---|---|
| 5,189,608 A | 2/1993 | Lyons et al. | |
| 5,327,555 A * | 7/1994 | Anderson | G06Q 10/109 345/169 |
| 5,392,390 A | 2/1995 | Crozier | |
| 5,978,779 A | 11/1999 | Stein et al. | |
| 6,182,279 B1 | 1/2001 | Buxton | |
| 6,195,794 B1 * | 2/2001 | Buxton | G06F 8/60 717/108 |
| 6,317,751 B1 * | 11/2001 | Yeger | G06Q 10/107 707/661 |
| 6,687,677 B1 | 2/2004 | Barnard et al. | |
| 7,044,365 B2 | 5/2006 | Witherspoon | |
| 7,130,822 B1 | 10/2006 | Their et al. | |
| 7,155,398 B2 | 12/2006 | Thier | |
| 7,209,888 B2 | 4/2007 | Fris-Nielsen et al. | |
| 7,289,974 B2 | 10/2007 | Godeby et al. | |
| 7,319,986 B2 * | 1/2008 | Praisner | G06Q 20/10 705/39 |
| 7,536,697 B2 * | 5/2009 | Wiseman | G06Q 10/06 709/203 |
| 7,630,989 B2 * | 12/2009 | Weir | G06Q 20/023 |
| 7,693,787 B2 | 4/2010 | Provinse | |
| 7,693,788 B2 | 4/2010 | Provinse | |
| 7,698,216 B2 | 4/2010 | Provinse | |
| 7,707,553 B2 * | 4/2010 | Roques | G06F 11/3684 714/34 |
| 7,756,784 B2 | 7/2010 | Provinse | |
| 7,856,388 B1 * | 12/2010 | Srivastava | G06F 17/30569 705/35 |
| 7,895,094 B2 * | 2/2011 | Tandon | G06Q 20/10 705/30 |
| 8,150,746 B2 * | 4/2012 | Tandon | G06Q 20/10 705/30 |
| 2001/0037294 A1 | 11/2001 | Freishtat et al. | |
| 2001/0051917 A1 | 12/2001 | Bissonette et al. | |
| 2002/0026416 A1 * | 2/2002 | Provinse | G06Q 10/02 705/39 |
| 2002/0029194 A1 * | 3/2002 | Lewis | G06Q 20/10 705/39 |
| 2002/0087445 A1 * | 7/2002 | Kaniwa | G06Q 40/00 705/35 |
| 2002/0174030 A1 * | 11/2002 | Praisner | G06Q 20/10 705/39 |
| 2003/0106040 A1 * | 6/2003 | Rubin | G06F 8/30 717/106 |
| 2003/0125969 A1 * | 7/2003 | Kizer | G06Q 20/02 705/64 |
| 2003/0212615 A1 | 11/2003 | Whitehead et al. | |
| 2003/0229541 A1 * | 12/2003 | Randall | G06Q 30/0235 705/14.26 |
| 2004/0015366 A1 * | 1/2004 | Wiseman | G06Q 10/06 705/1.1 |
| 2004/0059597 A1 * | 3/2004 | Tkaczyk | G06F 19/322 705/2 |
| 2004/0064398 A1 | 4/2004 | Browne et al. | |
| 2004/0068550 A1 | 4/2004 | Giannetti | |
| 2004/0186760 A1 | 9/2004 | Metzger | |
| 2004/0267751 A1 * | 12/2004 | Dill | G06F 17/30539 |
| 2004/0267771 A1 * | 12/2004 | Crowther | G06F 9/44 |
| 2005/0004885 A1 | 1/2005 | Pandian et al. | |
| 2005/0044015 A1 * | 2/2005 | Bracken | G06Q 20/04 705/30 |
| 2005/0080654 A1 * | 4/2005 | Huang | G06Q 10/06375 705/7.37 |
| 2005/0114239 A1 | 5/2005 | Fiascone et al. | |
| 2005/0149415 A1 | 7/2005 | Furphy et al. | |
| 2005/0165789 A1 * | 7/2005 | Minton | G06F 17/30905 |
| 2005/0177470 A1 * | 8/2005 | Tandon | G06Q 20/10 705/30 |
| 2005/0177507 A1 | 8/2005 | Bandych et al. | |
| 2005/0182768 A1 * | 8/2005 | Waldorf | G06Q 10/10 |
| 2005/0182774 A1 * | 8/2005 | Weir | G06Q 20/023 |
| 2005/0209955 A1 * | 9/2005 | Underwood | G06Q 10/10 705/38 |
| 2005/0246274 A1 * | 11/2005 | Abbott | G06Q 20/102 705/40 |
| 2006/0136810 A1 * | 6/2006 | Truong | G06F 17/243 715/222 |
| 2007/0006139 A1 * | 1/2007 | Rubin | G06F 8/30 717/106 |
| 2007/0065011 A1 * | 3/2007 | Schiehlen | G06K 9/00469 382/181 |
| 2007/0106687 A1 * | 5/2007 | Dailey | G06F 17/243 |
| 2007/0112653 A1 * | 5/2007 | Provinse | G06Q 10/02 705/30 |
| 2007/0118486 A1 | 5/2007 | Burchetta et al. | |
| 2007/0129960 A1 * | 6/2007 | Farrell | G06Q 10/10 379/93.06 |
| 2007/0130164 A1 * | 6/2007 | Kembel | G06F 17/3089 |
| 2007/0192678 A1 * | 8/2007 | Tang | G06F 17/243 715/234 |
| 2007/0240172 A1 * | 10/2007 | Banker | G06F 9/465 719/328 |
| 2007/0288336 A1 * | 12/2007 | Malaviya | G06Q 40/00 705/35 |
| 2008/0021822 A1 * | 1/2008 | Hinton | G06Q 10/10 705/40 |
| 2008/0091700 A1 * | 4/2008 | Brotherson | G06F 17/248 |
| 2008/0097789 A1 * | 4/2008 | Huffer | G06Q 50/22 705/2 |
| 2008/0103949 A1 * | 5/2008 | Lobana | G06Q 40/00 705/35 |
| 2008/0301762 A1 | 12/2008 | Malcolm | |
| 2008/0307263 A1 * | 12/2008 | Coulter, Jr. | G06F 11/261 714/37 |
| 2008/0319922 A1 | 12/2008 | Lawrence et al. | |
| 2009/0094124 A1 * | 4/2009 | Foss, Jr. | G06Q 20/04 705/16 |
| 2009/0249360 A1 * | 10/2009 | Wiseman | G06Q 10/06 719/315 |
| 2010/0325174 A1 * | 12/2010 | Hopkins | G06F 17/30861 707/805 |
| 2011/0208623 A1 * | 8/2011 | Tandon | G06Q 20/10 705/30 |

OTHER PUBLICATIONS

USPTO; Office Action dated Apr. 29, 2008 in U.S. Appl. No. 10/736,181.
USPTO; Office Action dated Dec. 9, 2008 in U.S. Appl. No. 10/736,181.
USPTO; Office Action dated May 26, 2009 in U.S. Appl. No. 10/736,181.
USPTO; Office Action dated Jan. 14, 2010 in U.S. Appl. No. 10/736,181.
USPTO; Final Office Action dated May 18, 2010 in U.S. Appl. No. 10/736,181.
USPTO; Advisory Action dated Jul. 28, 2010 in U.S. Appl. No. 10/736,181.
USPTO; Notice of Allowance dated Oct. 18, 2010 in U.S. Appl. No. 10/736,181.
Business/Technology Editors. "Scribe Software Announces Next-Generation Rapid Data Integration Software; Scribe Migrate and Scribe Integrate Will Simplify and Speed Data Integration Without Custom Programming :[1]." Business Wire Nov. 8, 1999, Business Dateline, ProQuest. Web. Oct. 4, 2010.
Business Editors & Health/Medical Writers BIOWIRE2K. "Esoterix Launches EDI System: entriX." Business Wire Jul. 29, 2002, Business Dateline, ProQuest. Web. Oct. 4, 2010.
USPTO; Notice of Allowance dated Aug. 9, 2013 in U.S. Appl. No. 11/552,892.
USPTO; Office Action dated Nov. 20, 2012 in U.S. Appl. No. 11/552,892.

(56) References Cited

OTHER PUBLICATIONS

USPTO; Office Action dated Apr. 13, 2012 in U.S. Appl. No. 11/552,892.
USPTO; Office Action dated Dec. 9, 2010 in U.S. Appl. No. 11/552,892.
USPTO; Office Action dated Mar. 30, 2010 in U.S. Appl. No. 11/552,892.
USPTO; Final Office Action dated May 30, 2013 in U.S. Appl. No. 11/552,892.
USPTO; Final Office Action dated Sep. 7, 2012 in U.S. Appl. No. 11/552,892.
USPTO; Final Office Action dated Jun. 2, 2011 in U.S. Appl. No. 11/552,892.
USPTO; Final Office Action dated Sep. 27, 2010 in U.S. Appl. No. 11/552,892.
USPTO; Advisory Action dated Aug. 5, 2011 in U.S. Appl. No. 11/552,892.
USPTO; Advisory Action dated Nov. 19, 2010 in U.S. Appl. No. 11/552,892.
USPTO; Notice of Allowance dated Dec. 18, 2013 in U.S. Appl. No. 14/071,323.

* cited by examiner

FIGURE 7

SYSTEM AND METHOD FOR RECONCILING ONE OR MORE FINANCIAL TRANSACTIONS

CROSS REFERENCE TO RELATED APPLICATIONS

This application is a continuation of, claims priority to and the benefit of, U.S. Ser. No. 14/071,323 filed Nov. 4, 2013 and entitled "SYSTEM AND METHOD FOR RECONCILING ONE OR MORE FINANCIAL TRANSACTIONS." The '323 application is a continuation of, claims priority to and the benefit of, U.S. Ser. No. 11/552,892 filed Oct. 25, 2006 and entitled "SYSTEM AND METHOD FOR RECONCILING ONE OR MORE FINANCIAL TRANSACTIONS," which issued as U.S. Pat. No. 8,600,845 on Dec. 3, 2013. The '892 application shares some common subject matter with commonly owned U.S. Pat. No. 7,895,094 issued Feb. 22, 2011 (aka U.S. patent application Ser. No. 10/736,181, filed Dec. 15, 2003). All of which are hereby incorporated by reference in their entirety.

BACKGROUND OF THE INVENTION

1. Field of the Invention

The present invention generally relates to managing financial transactions of one or more business units and more particularly, to reconciliation and reporting of financial transactions of one or more business units.

2. Related Art

Reconciliation is a financial process of matching debit and credit transactions for one or more accounts of one or more business units. The unmatched transactions may then be researched and cleared. In organizations with one or more business units, the business units may adopt different accounting systems. The accounting systems may differ in, for example, the computer operating systems, software applications, and the like. This makes the reconciliation process for such organizations difficult, as the financial data from different business units needs to be transformed from different data formats. Such conversions, if performed manually, tend to increase the volume of unmatched transactions. Hence, in order to ensure financial control in the business units and to comply with industry standards such as Sarbanes-Oxley, it is important to provide a standardized and controlled environment for the reconciliation process.

Existing reconciliation processes include manual reconciliation of the financial transactions. These manual reconciliation processes are error-prone and cause an increase in the number of unmatched transactions. There exist reconciliation tools, which provide automated reconciliation and reduce the manual effort and intervention required during the reconciliation process. However, the existing reconciliation tools require the data to be uploaded manually for reconciliation. Further, there is a limitation in auto-match logics that may be created. The existing tools do not provide the flexibility in creation of reports on the output of the reconciliation process. Further, the existing tools may not manage all financial transaction categories efficiently, and may not ensure a controlled reconciliation process.

Given the foregoing, what is needed is a system, method and computer program product for reconciling one or more financial transactions of one or more business units, which provide an automated and controlled reconciliation process with the flexibility to manage multiple data formats without manual intervention. Further, the reconciliation process needs to provide auto-match logic creation flexibility and strengthen the balance sheet hygiene.

BRIEF DESCRIPTION OF THE INVENTION

The present invention meets the above-mentioned needs by providing a system, method and computer program product for reconciling one or more financial transactions of one or more business units.

An advantage of the present invention is that it automates the reconciliation of one or more financial transactions and reduces the manual effort required in the reconciliation process.

Another advantage of the present invention is that it enables the reconciliation of one or more financial transaction in a controlled and standardized manner.

Yet another advantage of the present invention is that it provides the flexibility to manage one or more financial transactions with different data formats.

Still another advantage of the present invention is that it provides the flexibility to simultaneously perform multiple activities of the reconciliation process.

Still another advantage of the present invention is that it provides the flexibility to create auto-match logics required for providing efficient automation of the reconciliation process.

Still another advantage of the present invention is that it provides the capability of testing and approving different activities of the reconciliation process.

Various embodiments of the present invention provide a system, method and computer program product for reconciling one or more financial transactions of one or more business units. The method includes capturing transaction data from the financial transactions using a first set of validations. Herein, capturing of the transaction data includes extracting the transaction data from the financial transactions having one or more formats, and transforming the extracted transaction data to a predefined format, using a first set of data logics. Thereafter, the captured transaction data is auto-matched using master data. The auto-matching is performed using one or more auto-match logics and a second set of validations to provide matched transaction data and open transaction data. Herein, the auto-match logics may include permutations of one or more arithmetic algorithms.

Thereafter, one or more reports are generated, providing details on the matching. The method also includes providing user privileges for controlling the capturing of transaction data, the auto-matching of the captured transaction data, and the generation of one or more reports. Further, the method may include manual matching of the captured transaction data. The method includes performing audit trails on the capturing, the auto-matching and the generation of reports. The method may also include performing one or more of the aforementioned functions simultaneously.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings, in which like reference numbers indicate identical or functionally similar elements. Additionally, the left-most digit of a reference number identifies the drawing in which the reference number first appears.

FIG. 7 is an exemplary screenshot illustrating a scheduler, in accordance with an embodiment of the present invention;

DETAILED DESCRIPTION

I. Overview

The present invention is directed to a system, method and computer program product for reconciling one or more financial transactions of one or more business units. The reconciliation may be required for financial transactions that include, for example, bank statements, General Ledger of an organization, Sub-Ledgers, and the like. The system and the process described herein provide an efficient electronic reconciliation and control tool, which may be used to automate and standardize the process of reconciliation. In accordance with an embodiment of the present invention, the system and the process may be used to establish compliance with industry standards such as the Sarbanes-Oxley standard.

The present invention is now described in more detail herein in terms of the above exemplary system, method and computer program product. This is for convenience only and is not intended to limit the application of the present invention. In fact, after reading the following description, it will be apparent to one skilled in the relevant art(s) how to implement the following invention in alternative embodiments.

II. System

Figure 1:
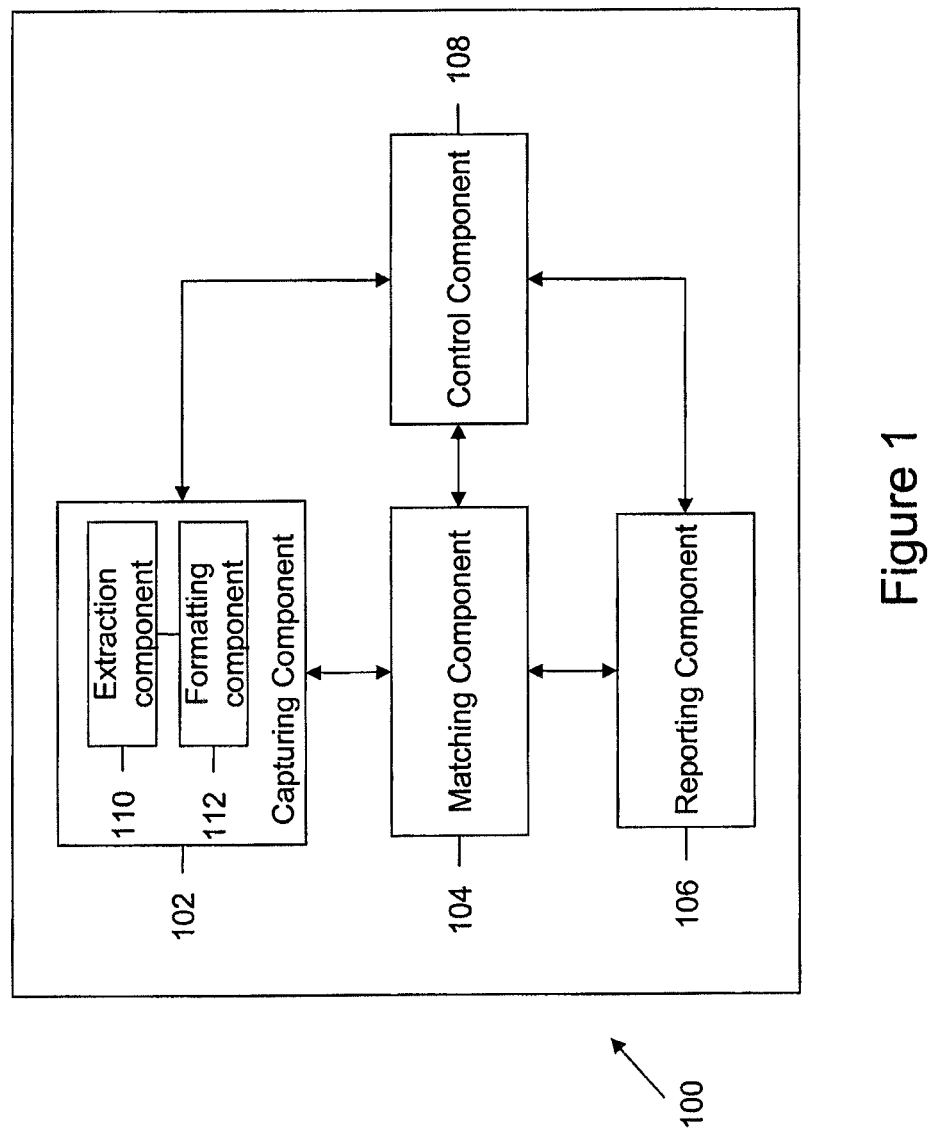
FIG. 1 is a block diagram of an exemplary system for reconciling one or more financial transactions of one or more business units, in which the present invention, in an embodiment, may be implemented.

FIG. 1 is a block diagram of an exemplary system 100 for reconciling one or more financial transactions of one or more business units, in which the present invention, in an embodiment, may be implemented.

System 100 may be used to manage the reconciliation of the financial transactions, which may include, for example, financial information related to one or more business units of an organization. The examples of the financial transactions may include bank statements, General Ledgers, Sub Ledgers, and the like.

System 100 includes a capturing component 102, a matching component 104, a reporting component 106, and a control component 108. Capturing component 102 captures transaction data from the financial transactions. Capturing component 102 further includes an extraction component 110 and a formatting component 112. Extraction component 110 enables extraction of the transaction data from the financial transactions. Formatting component 112 transforms the extracted transaction data into a predefined format. The captured transaction data may include specific information from the financial transactions.

The captured transaction data is then directed to matching component 104. Matching component 104 performs auto-matching of the captured transaction data using master data. The auto-matched transaction data is directed to reporting component 106. Reporting component 106 generates one or more reports providing details on the auto-matched transaction data. Control component 108 provides user privileges for controlling the functions of capturing component 102, matching component 104 and reporting component 106.

In accordance with various embodiments of the invention, the financial transactions may have one or more data formats such as MS Excel format, text format, comma separated values format, and the like. Further, the financial transactions may be received from different sources that may include for example, different departments of the organizations, external sources such as banks, and the like. The transaction data may include complete financial transactions or a portion of the financial transactions. For example, the transaction data extracted from a financial transaction such as a bank statement may include, account numbers, credit amounts, debit amounts, date of transactions, mode of transactions, and the like.

In accordance with various embodiments of the invention, capturing component 102 captures the transaction data using a first set of data logics. The first set of data logics may include, for example, one or more algorithms, computer codes, and the like. One or more of the first set of data logics may be executed, for example, by extraction component 110 to extract the transaction data from the financial transactions and by formatting component 112 to transform the extracted transaction data from the one or more formats to the predefined format. In accordance with an embodiment of the invention, the first set of data logics may be created by specifying the required fields such as account numbers, date of transactions, credit amounts, debit amounts, and the like. In accordance with an embodiment of the invention, the first set of data logics may be created by one or more substrings. The substrings may include, for example, one or more permutations of arithmetic algorithms.

Extraction component 110 extracts the transaction data from the financial transactions using the first set of data logics. Formatting component 112 transforms the extracted transaction data to the predefined format. For example, the extracted transaction data may be transformed from text format to MS Excel format; date of transactions in one format may be transformed to another format, and the like.

The conversion to the predefined format may be performed to facilitate and standardize, for example, the auto-matching, the reporting, and the like.

In accordance with various embodiments of the invention, capturing component 102 captures the transaction data from the financial transactions using one or more import templates. In accordance with an embodiment of the invention, capturing component 102 may also include provisions to create the import templates. The import templates may be created based on, for example, type of the financial transactions, the formats of the financial transactions, the predefined format required for reconciliation, and the like. In accordance with an embodiment of the invention, the import templates are re-usable.

For example, Table 1 depicts a financial transaction that is reconciled using system 100.

TABLE 1

01, 005990725, 055990725, 060119, 0000, 1, 80, 1, 2/
02, 0055990725, ABNANL2AXXX, 1, 060118, 0000,/
03, 30000200887280, GBP, 010, -3299254129, , , 015,-6676921745, , , 045, -6676921745, ,/
16, 399, 2376, V, 060118, 0000, , NONREF, ,/
88, HDG=MISCELLANEOUS CREDIT, YOUR REF=NONREF; ALLREF = SABRE MKTG UK BGC ICRM 1 3KULE6/
16, 399, 4073, V, 060118, 0000, , NONREF, ,/
88, HDG=MISCELLANEOUS CREDIT, YOUR REF=NONREF; ALLREF = SABRE MKTG UK BGC ICRM 1 3KRTE5/
16, 399, 5656, V, 060118, 0000, , NONREF, , /
88, HDG=MISCELLANEOUS CREDIT, YOUR REF=NONREF; ALLREF = AEIBGB2XXXX
F/FLOW0143305310163259/
16, 399, 5760, V, 060118, 0000, , NONREF, ,/
88, HDG=MISCELLANEOUS CREDIT, YOUR REF=NONREF; ALLREF = SABRE MKTG UK BGC ICRM 1 3KJZ1U/

Capturing component 102 captures the relevant transaction data from the financial transaction Table 2 depicts an exemplary import template in which the transaction data is extracted using the first set of data logics. Table 2 further depicts the transformed transaction data, which has been transformed to the predefined format.

combination being equal to zero, addition of the opening balance and activity being equal to closing balance, and the like.

Matching component 104 executes one or more auto-match logics for performing the auto-matching. The auto-match logics may include, for example, one or more algorithms for automatically matching the captured transaction data using the master data. The auto-match logics may be defined using standard functions such as filters, string, right, left, concatenate, data deviation, and the like. In accordance with an embodiment of the invention, the auto-match logics may be created using one or more substrings. The substrings may include, for example, permutations of arithmetic algorithms. Further, matching component 104 performs auto-matching using a second set of validations. The second set of validations may include, for example, rules for performing the auto-matching, marking the transaction data to be auto-matched, approving the auto match logics, and the like.

Auto-matching of the captured transaction data performed by matching component 104 provides auto-matched transaction data. The auto-matched transaction data includes matched transaction data and open transaction data. Herein,

TABLE 2

| ACCOUNT | TRXNDT | REF | DESC | | DEBIT | CREDIT | CHQNO |
|---|---|---|---|---|---|---|---|
| 30000200887280 | Jan. 18, 2006 | CREDIT, YOUR REF | TRANSFER | 20/02 | 0.00 | 7000000.00 | |
| 30000200887280 | Jan. 18, 2006 | AMEX | AMERICAN EXPRESS | F/FLOW/ | 0.00 | 2940000.00 | |
| 30000200887280 | Jan. 18, 2006 | BACS | BGC | BACS/ | 0.00 | 1158364.02 | |
| 30000200887280 | Jan. 18, 2006 | BACS | BGC | BACS/ | 0.00 | 1023635.90 | |
| 30000200887280 | Jan. 18, 2006 | AMEX | AMERICAN EXPRESS | F/FLOW/ | 0.00 | 750000.00 | |
| 30000200887280 | Jan. 18, 2006 | BACS | BGC | BACS/ | 0.00 | 602626.28 | |

In accordance with another embodiment of the present invention, the transaction data is extracted and transformed to the predefined format manually. It may be evident to a person skilled in the art that a combination of manual capturing and automated capturing may also be used for capturing the transaction data.

Capturing component 102 uses a first set of validations for capturing the transaction data. The first set of validations may include, for example, validations for capturing the transaction data from the financial transactions, approvals for performing the extraction, approvals for transforming the extracted transaction data, and the like. The first set of validations may include general validations such as period of reconciliation, reconciliation month, pre-account setup, approval flags, and the like. The first set of validations may further include, checking formats of the captured transaction data, performing checks such as the sum of closing balances of balance sheet accounts for specified level and currency the open transaction data includes unmatched transaction data. The open transaction data may then be reviewed and processed manually.

In accordance with an embodiment of the present invention, reporting component 106 may use automation tools such as the Cognos reporting tool, available from Cognos Incorporated, Ottawa, Ontario, Canada (http://www.cognos.com), for generating the reports. The reports may include the matched and the open transaction data and may be present in different formats such as MS Word format, Common Data Format (CDF), and the like. Further, the reports may be detailed or may provide summary level information. In accordance with an embodiment of the invention, the reports may also provide information regarding the financial transactions. The reports may also include trend analysis of the auto-matched transaction data using historical data. In accordance with various embodiments of the invention, reporting component 106 may provide options to extract the reports by, for example, printing, emailing, and the like.

Control component 108 provides user privileges for controlling capturing component 102, matching component 104 and reporting component 106; privileges for transferring access rights from one user to another user; privileges for granting multiple roles to a user; account level privileges such as defining tolerance limits, collapsing, manual match, and the like. The user privileges may be provided according a first predefined criterion, which may include, for example, hierarchy of a user in an organization, roles assigned to the user, and the like. The user privileges may also be provided based on, for example, transaction level details, account level details, and the like. In accordance with an embodiment of the invention, the user privileges may further include approval privileges. The approval privileges may include, for example, privileges for approving the first set of data logics, privileges for approving the import templates, privileges for approving the auto-match logics, privileges for approving the use of the import templates, and the like.

Figure 2:
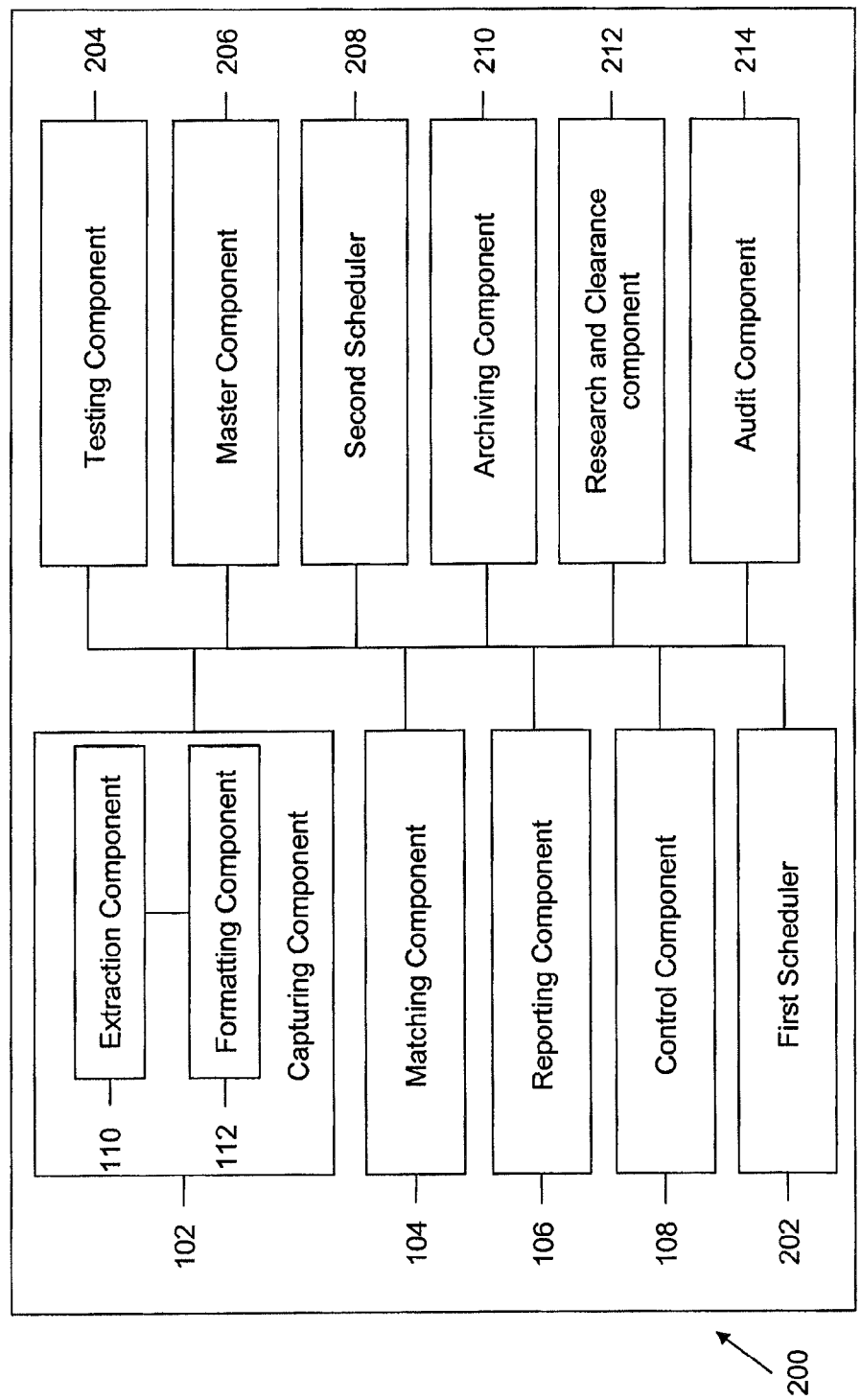
FIG. 2 is a block diagram of an exemplary system for reconciling one or more financial transactions of one or more business units, in which the present invention, in another embodiment, may be implemented.

FIG. 2 is a block diagram of an exemplary system 200 for reconciling one or more financial transactions of one or more business units, in which the present invention, in another embodiment, may be implemented.

System 200 includes capturing component 102, matching component 104, reporting component 106 and control component 108. System 200 also includes a first scheduler 202, a testing component 204, a master component 206, a second scheduler 208, an archiving component 210, a research and clearance component 212 and an audit component 214. Capturing component 102 further includes extraction component 110 and formatting component 112.

Capturing component 102 captures transaction data from the financial transactions using the first set of data logics and the first set of validations. In accordance with an embodiment of the invention, capturing component 102 may provide notifications on the errors made during capturing of the transaction data. Capturing component 102 may provide the notifications using one or more views. The views may include, for example, user interfaces, display windows, and the like. In accordance with various embodiments of the invention, the views facilitate reviewing of the uncaptured transaction data. The reviewing may include, for example, rectification of the uncaptured transaction data, updating the captured transaction data, and the like. The reviewed data may then be captured using capturing component 102.

In accordance with various embodiments of the invention, the first set of data logics may be scheduled for automatic execution at a specific time. Further, the execution of the first set of data logics may be performed regularly after specific time intervals. The scheduling of the first set of data logics is performed using first scheduler 202 according to a second predefined criterion. The scheduling enables automatic capturing of the transaction data. Herein, examples of the second predefined criterion may include, the frequency at which the financial transactions are received, time interval after which scheduling is performed, and the like. For example, the first set of data logics may be scheduled for execution at the start of every month.

The captured transaction data is then provided to matching component 104. Matching component 104 may perform splitting of the captured transaction data to facilitate auto-matching. In particular, the splitting may be used to match a consolidated captured transaction data with a non-consolidated captured transaction data. For example, a consolidated General Ledger transaction of $100 may be broken down into five transactions of $20 each and may then be matched. In accordance with an embodiment of the invention, the splitting may be performed manually.

Testing component 204 is used to test the import templates created using capturing component 102. In accordance with various embodiments of the invention, testing component 204 may also be used for testing the first set of data logics and the auto-match logics. In accordance with an embodiment of the invention, testing component 204 enables testing of the import templates while performing reconciliation using system 200.

Matching component 104 uses the master data as reference for auto-matching. The master data may also be used as a reference by other components of system 200 such as capturing component 102, matching component 104, and reporting component 106. The master data is set up by master component 206. Herein, the master data may include rules and conditions, for example, currency conversion, hierarchy level of the organization, and the like, required for performing the capturing, the auto-matching and the reporting. Examples of the master data may include, a business unit master, a business hierarchy level master, an account master, a currency master, a bank and system holiday master, a department master, a remarks master, a user master, a look-up table master, a reporting group master, and the like. In accordance with an embodiment of the invention, master component 206 may perform the setting up of the master data for more than one business units simultaneously.

In accordance with an embodiment of the invention, matching component 104 optionally performs tolerance matching. Tolerance matching includes matching of the captured transaction data within a predefined tolerance limit. Herein, the tolerance limit may be expressed as a percentage value or may have, for example, an absolute dollar ($) value. For example, if the tolerance limit has an absolute value of $5, then a transaction with an absolute value of $100 may be matched with another transaction with absolute value of $105. In accordance with an embodiment of the invention, the tolerance matching is performed automatically using, for example, arithmetic algorithms. In accordance with another embodiment of the invention, the tolerance matching may be performed manually.

In accordance with an embodiment of the invention, matching component 104 may also enable manual matching of the captured transaction data.

In accordance with various embodiments of the invention, the auto-match logics may be scheduled for automatic execution at a specific time, using second scheduler 208. Second scheduler 208 enables the execution of the auto-match logics according to a third predefined criterion. Examples of the third predefined criterion may include the frequency at which the financial transactions are received, time interval after which the scheduling is performed, and the like. For example, the auto-match logics may be scheduled for execution at the start of every month. In accordance with an embodiment of the invention, more than one of the auto-match logics and the first set of data logics may be scheduled for execution at the same time.

In accordance with an embodiment of the invention, matching component 104 may also enable providing reason and resolution remarks on the open transaction data. Matching component 104 may be used to perform a multi-level search for details like the transaction data, the captured transaction data, the auto-matched transaction data, and the like. For example, the multi-level search may include searching for account level information and transaction level information in a database. Herein, the database may be used to save the details with related information, such as a timestamp.

Reporting component 106 generates one or more reports on the auto-matched transaction data. Reporting component 106 may also generate one or more reports on the captured transaction data. Examples of the reports may include, master reports, ad-hoc reports, audit trail reports, historical reports, and the like. Reporting component 106 also enables extraction of the reports, for example, by taking printouts. The reports may be generated for a currently captured transaction data or a previously captured transaction data stored in, for example, the database.

Archiving component 210 archives the reports generated by reporting component 106. The reports may be retrieved when required, by using, for example, a search interface enabling searching based on the relevant account numbers and timestamps. Archiving component 210 also archives and performs versioning of the captured transaction data, the matched transaction data, the open transaction data, the master data, the reports, and the like. In accordance with an embodiment of the invention, archiving component 210 may perform archiving at regular time intervals. In accordance with another embodiment of the invention, archiving may be performed on ad-hoc basis.

Research and clearance component 212 manages the open transaction data by performing research and clearance of the open transaction data. This may include creating Journal Entries of the open transaction data, based on predefined Journal Entry criteria. In accordance with various embodiments of the invention, research and clearance component 212 may also enable a user to automatically execute the Journal Entry criterion. Once Journal Entries of the open transaction data are created, the open transaction data may be referred as closed. The closing of the open transaction data may then be archived by archiving component 210. In accordance with various embodiments of the invention, research and clearance component 212 may enable searching for the captured transaction data, the open transaction data, and the like.

Audit component 214 performs audit trails on the activities of the components of system 200. For example, audit trails may be performed on modifications in the import templates, the manual matching and the auto-matching, the auto-match logics, the first set of data logics, the captured transaction data, the master data, the privileges granted to a user, and the like. Audit component 214 may also be used for maintaining adequate and complete date, time and user identification stamp for every activity performed using system 200.

In accordance with various embodiments of the invention, system 200 may provide multiprocessing of different components of system 200. Herein, the users may perform different activities of the reconciliation process simultaneously. These activities may include manual as well as automated activities.

In accordance with various embodiments of the invention, control component 108 may provide functions such as lookup tables for transforming, for example, a bank code into a General Ledger code, reporting group for extracting one or more reports, pagination, and the like. Herein, pagination may be used to select relevant transaction data from multiple financial transactions. Further, control component 108 may also provide a first level notification facility. The first level notification facility may include sending notifications for, for example, an incomplete scheduled activity. For example, control component 108 may send a notification to a user through email when a scheduled task fails.

In accordance with an embodiment of the invention, system 200 may enable remote matching in a controlled manner. The remote matching may be performed manually by a user at a remote location. In accordance with an embodiment of the invention, the remote location may not be directly connected to system 200. In this case, the transaction data captured by capturing component 102 is directed to the remote location where a manual matching may be performed. The matched transaction data and the open transaction data are then directed back to system 200 for reporting. In accordance with an embodiment of the invention, the captured transaction data is attached to an executable application and directed to the remote location. The application may be executed at the remote location and the captured transaction data may be extracted at the remote location. The application may also be configured to assist manual matching of the captured transaction data. System 200 may also keep an identification (ID) of the user performing the manual matching. In accordance with an embodiment of the invention, control component 108 may provide controls and define user privileges for the remote matching. In accordance with various embodiments of the invention, the second set of validations may also include validations for controlling the remote matching. In accordance with an embodiment of the invention, system 200 may also provide a parent-child facility for sequencing the activities of the components of system 200. For example, a parent activity, which may include, for example, the capturing of the transaction data and a child activity, which may include, for example, the auto-matching, may be executed in a sequence. Further, the parent-child facility may enable execution of the child activity such as the auto-matching, based on a predefined condition, which may include, for example, successful completion of the capturing step.

III. Process

Figure 3:
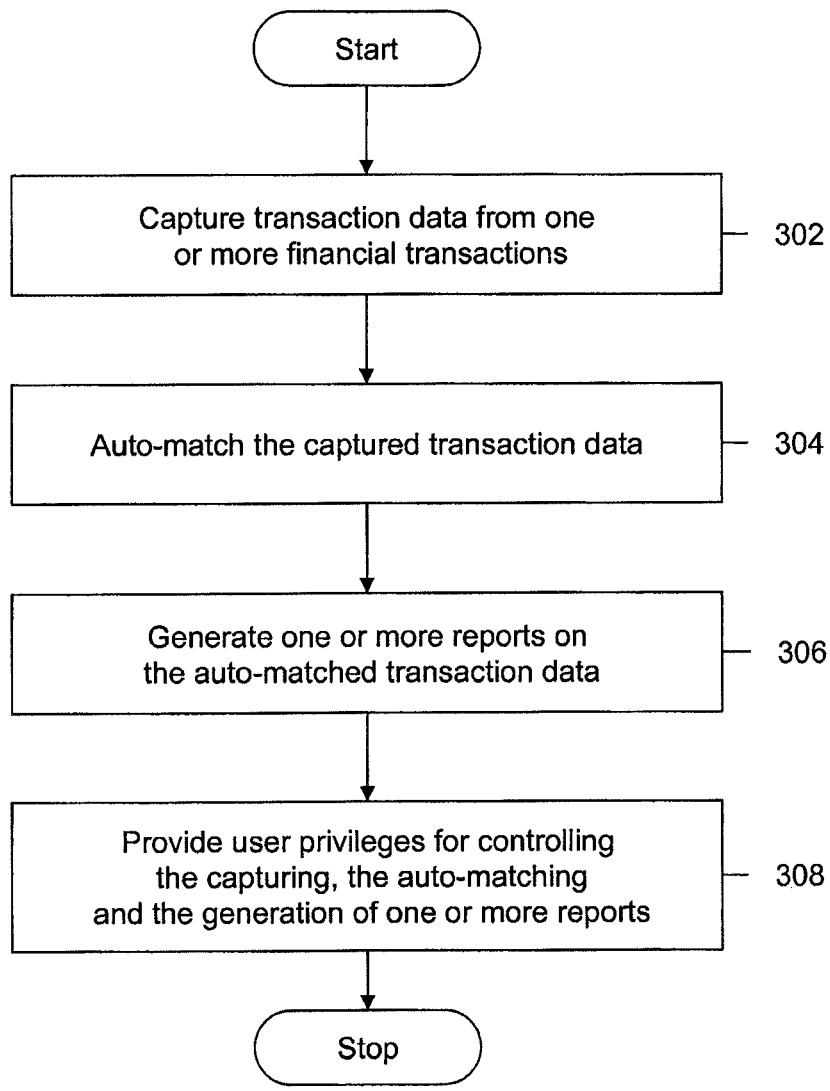
FIG. 3 is a flowchart illustrating a process of reconciling one or more financial transactions of one or more business units, according to an embodiment of the present invention.

FIG. 3 is a flowchart illustrating a process 300 of reconciling one or more financial transactions of one or more business units, according to one embodiment of the present invention.

Process 300 begins at step 302, which includes capturing transaction data from one or more financial transactions of one or more business units. The financial transactions may have one or more data formats. Herein, capturing the transaction data further includes the steps of extracting the transaction data and transforming the extracted transaction data into a predefined format. The capturing of the transaction data is performed using a first set of data logics and a first set of validations. The first of data logics and the first set of validations are explained in conjunction with FIG. 1 and FIG. 2.

At step 304, the captured transaction data is auto-matched using master data. The auto-matching is performed using one or more auto-match logics and a second set of validations. Herein, the auto-match logics may include permutations of one or more arithmetic algorithms. The auto-match logics and the second set of validations are explained in conjunction with FIG. 1 and FIG. 2.

The auto-matching of the captured transaction data provides the auto-matched transaction data including the matched transaction data and the open transaction data. At step 306, one or more reports are generated on the auto-matched transaction data. The reports may include details on the matched transaction data and the open transaction data. At step 308, user privileges are provided for controlling the capturing, the auto-matching and the generation of one or more reports. In accordance with various embodiments of the invention, the user privileges may be provided according to a first predefined criterion, which may include, for example roles assigned to a user, capabilities of the roles assigned, hierarchy level of the user in the organization, and the like. It may be evident to a person skilled in the art that the step 308 may also be performed at any stage of the process 300 to ensure a controlled reconciliation process.

Figure 4:
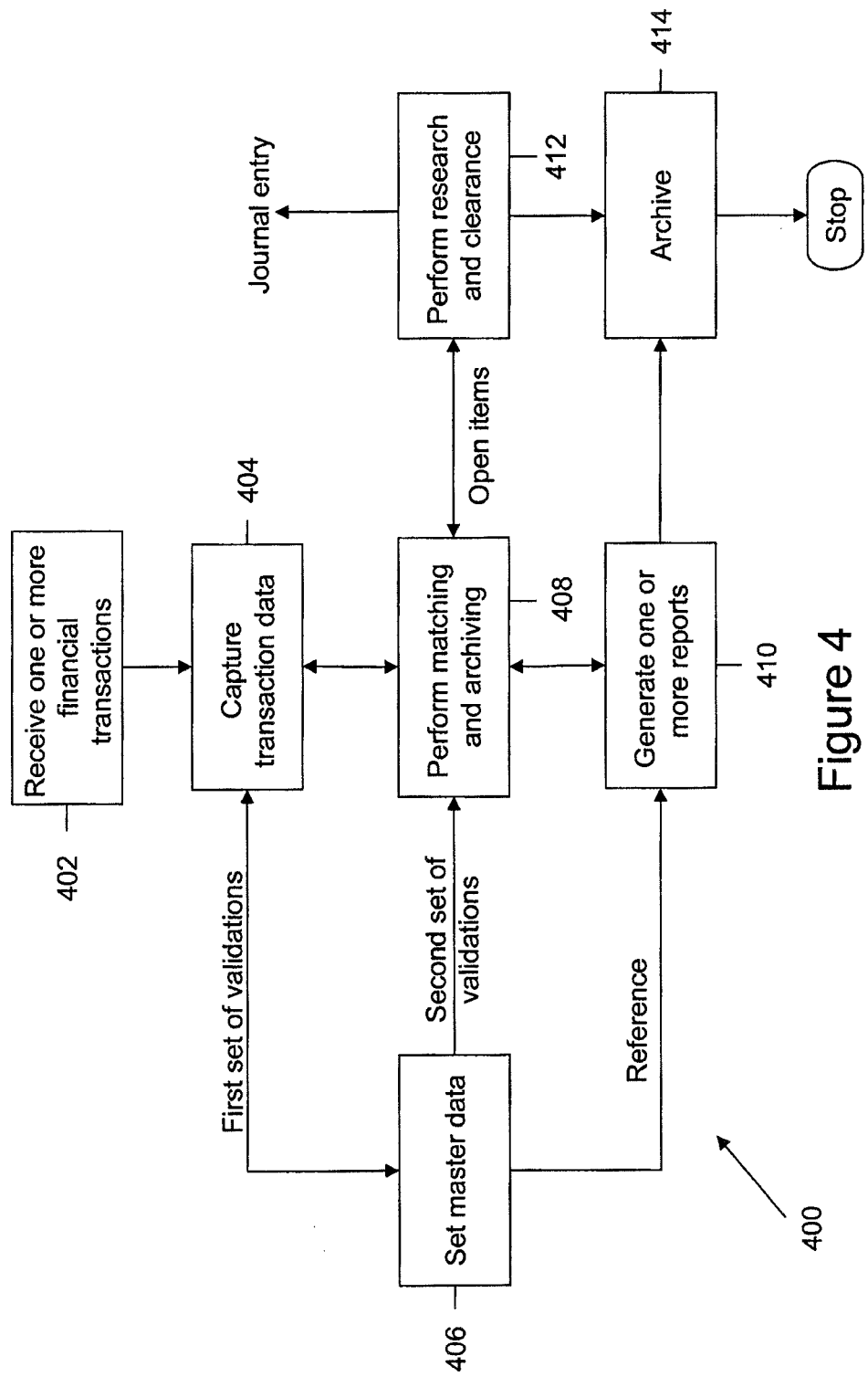
FIG. 4 is a flowchart illustrating a process of reconciling one or more financial transactions of one or more business units, according to another embodiment of the present invention.

FIG. 4 is a flowchart illustrating a process 400 of reconciling one or more financial transactions of one or more business units, according to another embodiment of the present invention.

Process 400 begins at step 402, where the financial transactions are received for reconciliation. In accordance with various embodiments of the invention, the financial transactions may be received from different sources such as banks and other sub systems, or may include General Ledger entries within an organization. The financial transactions received from the different sources may have one or more data formats. At step 404, transaction data is captured from the financial transactions. Herein, the capturing further includes the steps of extracting the transaction data from the financial transactions and transforming the extracted transaction data into a predefined format. In accordance with an embodiment of the invention, the transaction data is extracted and transformed using one or more import templates.

The capturing of the transaction data is performed using the first set of data logics and the first set of validations. In accordance with an embodiment of the invention, the first set of data logics may be scheduled for automatic execution at a specific time. Step 404 may further comprise testing the import templates, the first set of data logics, the first set of validations, and the like.

At step 406, master data is set up. In accordance with an embodiment of the invention, step 406 may be performed before step 404 to enable the use of master data in capturing of the transaction data using the first set of validations. At step 408, the captured transaction data is auto-matched using the master data and one or more auto-match logics. In accordance with an embodiment of the invention, step 408 may further include splitting of the transaction data to facilitate the auto-matching. Further, the auto-match logics may be scheduled for automatic execution of the auto-matching at a specific time. Step 408 may also include testing the import templates, the auto-match logics, the second set of validations, and the like. In accordance with an embodiment of the invention, step 408 may be performed manually.

In accordance with an embodiment of the invention, step 408 may optionally include performing manual matching of the captured transaction data at a remote location. Herein, the transaction data is captured from the financial transactions and manual matching of the captured transaction data is performed without accessing the system such as system 200, which performs the steps of process 400.

At step 410, one or more reports on the auto-matched transaction data are generated. In accordance with an embodiment of the present invention, the reports are generated using the Cognos reporting tool. At step 412, research and clearance of the open transaction data is performed. The research and clearance of the open transaction data includes creation of one or more Journal Entries into a General Ledger system. In accordance with an embodiment of the invention, research and clearance may be used for tracing details of the open transaction data and facilitates in clearing of the open transaction data. At step 414, archiving of the transaction data, the captured transaction data, the auto-matched transaction data, the reports, and the master data may be performed. In accordance with an embodiment of the invention, archival may be controlled by month-close process that includes versioning of the transaction data, the auto-matched transaction data and the reports.

In accordance with an embodiment of the invention, user privileges may be defined to enable control on the execution of the steps of process 400. Further approvals may be required for performing the steps of process 400. The user privileges and the approvals may be granted based on a predefined criterion.

In accordance with an embodiment of the invention, process 400 may also include performing audit trails at one or more steps of process 400. The audit trails may be used to log the inputs and the outputs at each step and may also include information like a timestamp, user identification, and the like. The audit trails may also be used to log the information related to control of process 400 and the access privileges of each user. The information captured in the audit trails enables efficient control of the reconciliation process.

Figure 5A:
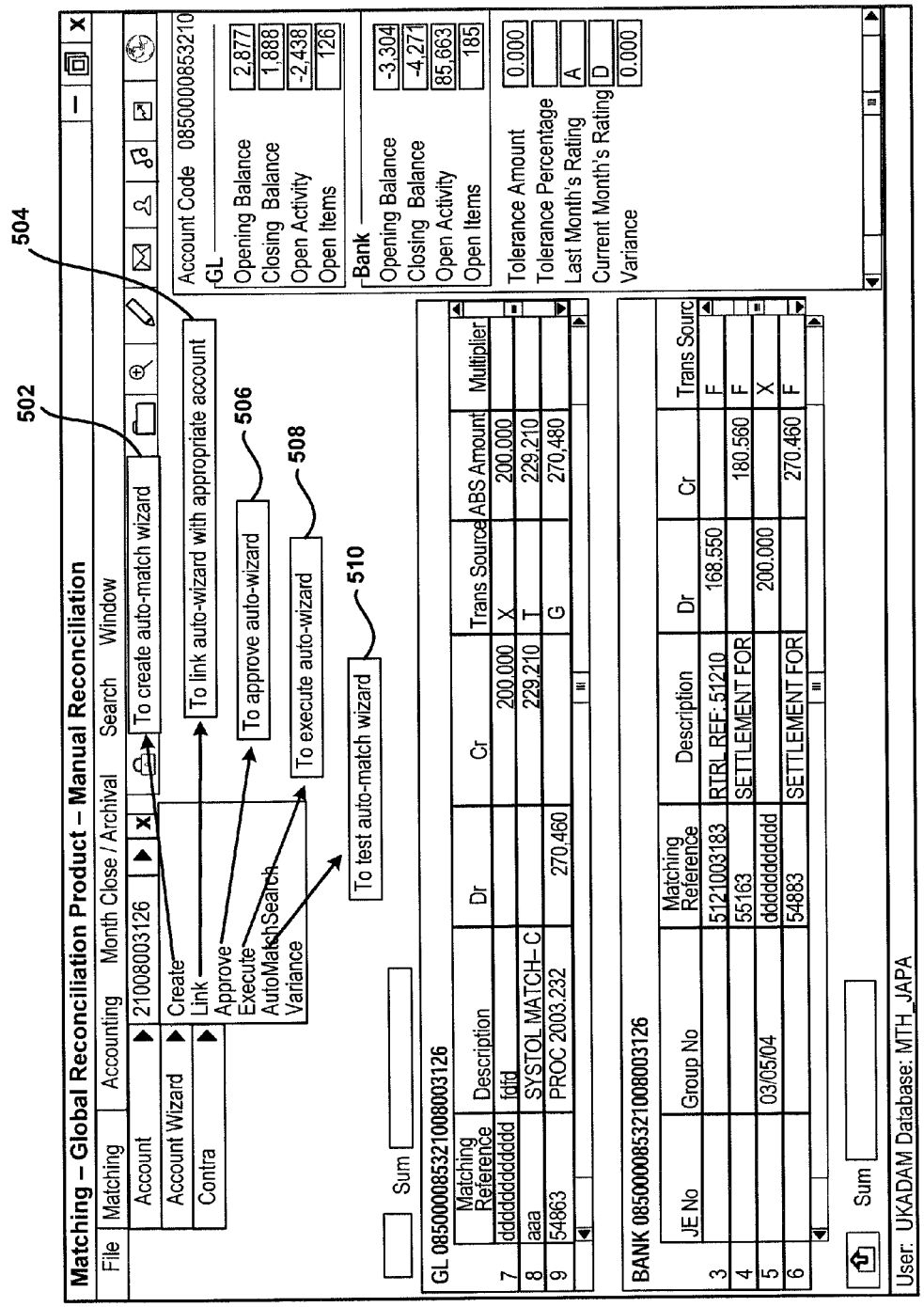
FIG. 5a is an exemplary screenshot illustrating a user interface for performing auto-matching, in accordance with an embodiment of the present invention.

FIG. 5a is an exemplary screenshot illustrating a user interface for performing auto-matching, in accordance with an embodiment of the present invention. FIG. 5a illustrates a section 502, a section 504, a section 506, a section 508, and a section 510. Section 502 is a link to a first interface, which may be used for creating an auto-match wizard. The auto match wizard may include one or more auto match logics that are similar to the auto-match logics explained in conjunction with FIG. 1 and FIG. 2. Section 504 indicates a link to a second interface and may be used for linking the auto-match wizard with appropriate financial transactions, business units, and the like, for which auto-matching is to be performed. Section 506 indicates a link to a third interface, which may be used to approve the auto-match wizard. Further, the third interface may be used to approve linking of the auto-match wizard with the financial transactions. Section 508 is a link to a fourth interface, which may be used for executing the auto-match wizard. In accordance with an embodiment of the invention, the execution of the auto-match wizard may be performed manually. In accordance with another embodiment of the invention, the execution of the auto-match wizard may be scheduled using the fourth interface. Section 510 is a link to a fifth interface, which may be used for testing the auto-match wizard.

Figure 5B:
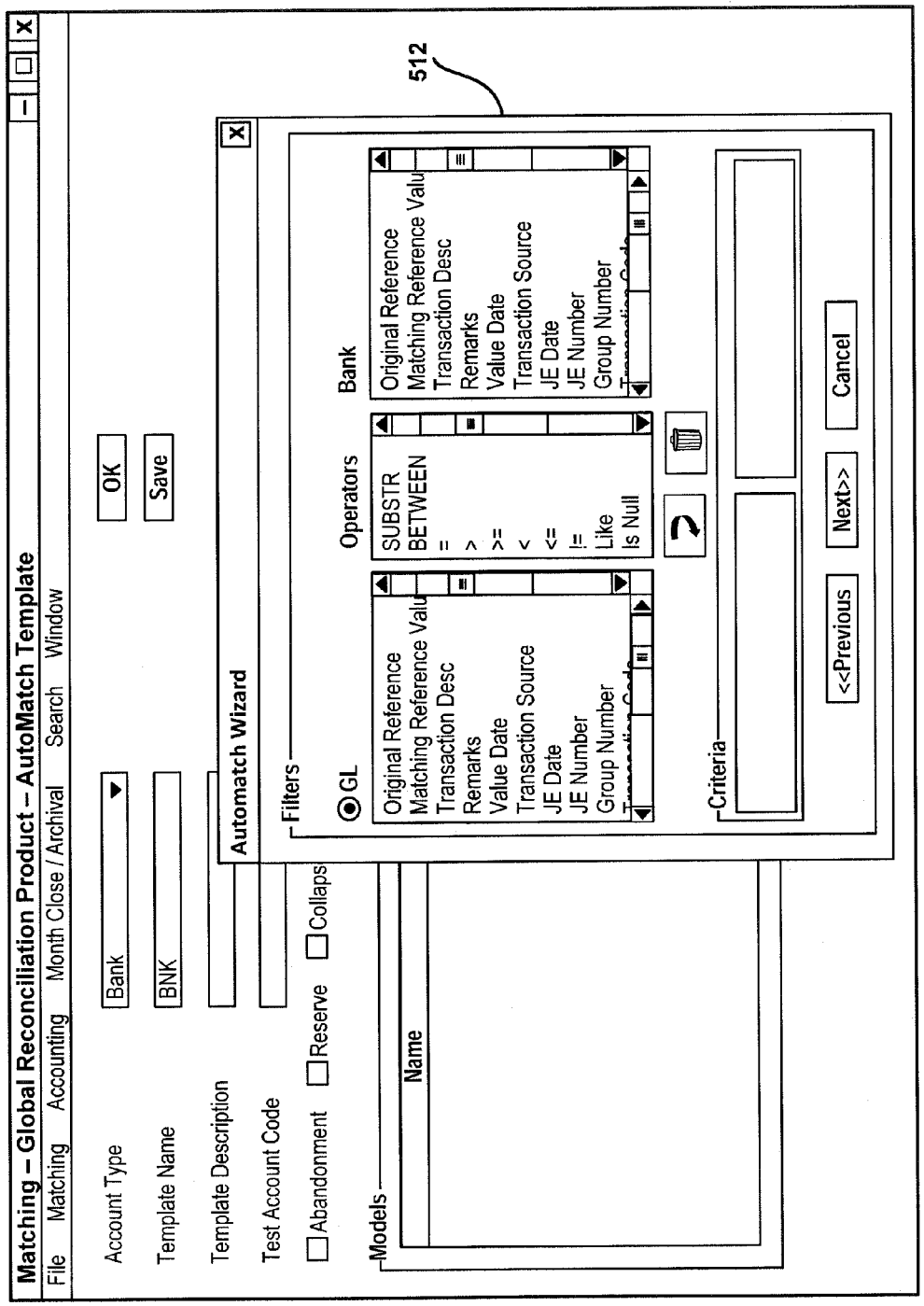
FIG. 5b is an exemplary screenshot illustrating an auto-match wizard used for auto-matching, in accordance with an embodiment of the present invention.

FIG. 5b is an exemplary screenshot illustrating an auto-match wizard 512 used for auto-matching, in accordance with an embodiment of the present invention. The auto-match logics may be created using the predefined fields in the auto-match wizard.

Figure 5C:
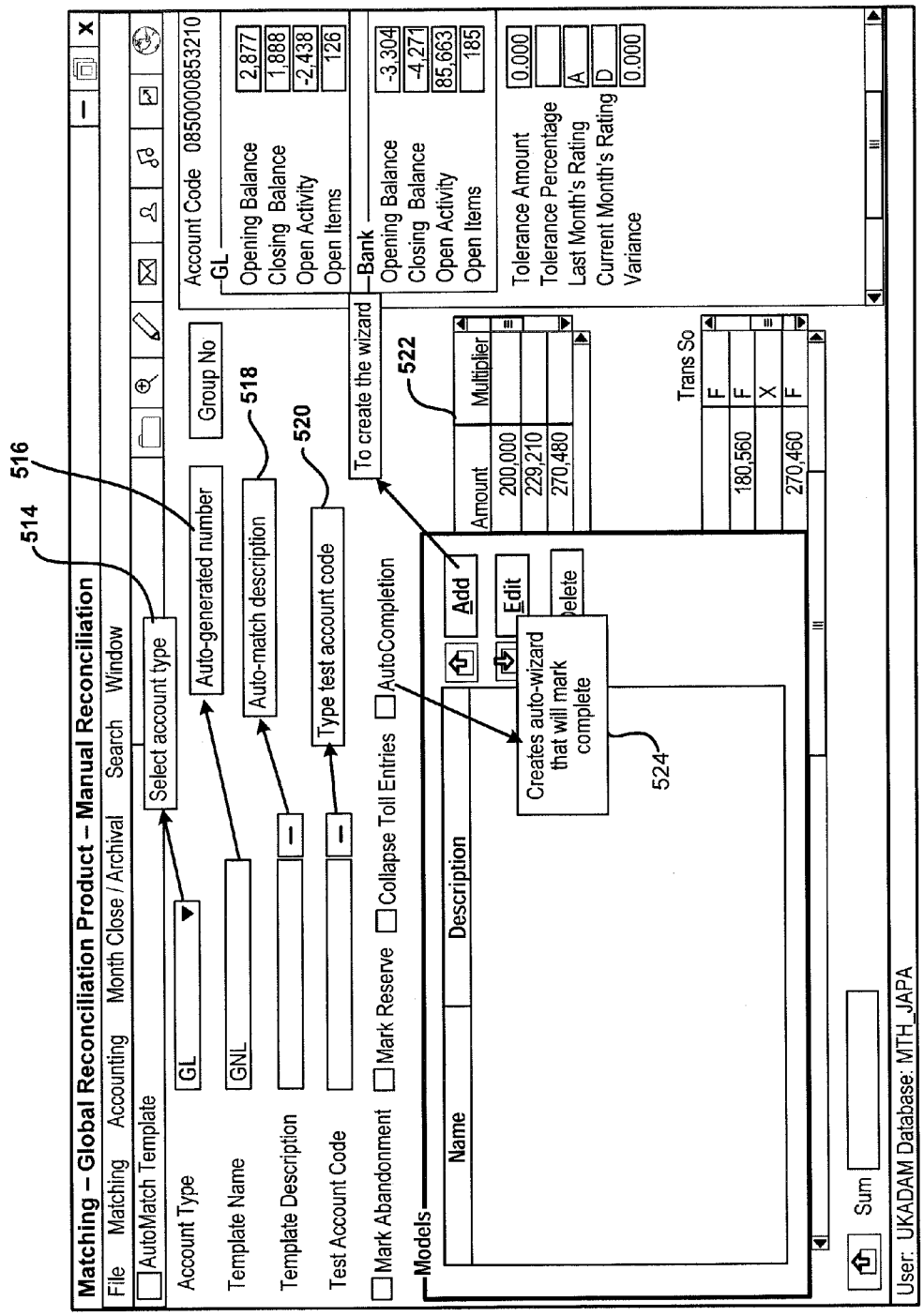
FIG. 5c is an exemplary screenshot illustrating a process for creating an auto-match wizard, in accordance with an embodiment of the present invention.

FIG. 5c is an exemplary screenshot illustrating a process for creating a new auto-match wizard, in accordance with an embodiment of the present invention. FIG. 5c includes a section 514, a section 516, a section 518, a section 520, a section 522, and a section 524. Section 514 indicates a link, which may be used for selecting a financial transaction category, for which auto-matching is to be performed. In particular, section 514 includes a dropdown menu for selecting a predefined financial transaction category. Section 516 is used for illustrating a template name. The template name may be an auto-generated number assigned to an auto-match wizard. Section 518 is used for specifying auto-match description which may include description of the auto-match logics. Section 520 may be used for specifying a test account code, which may be used for testing the results of the auto-matching. Section 522 is a link to a sixth interface that may be used to create the auto-match wizard. Section 524 is a link that may be used for marking zero balance and zero activity financial transaction as complete. Further section 524 enables approval of the completed transactions.

Figure 6A:
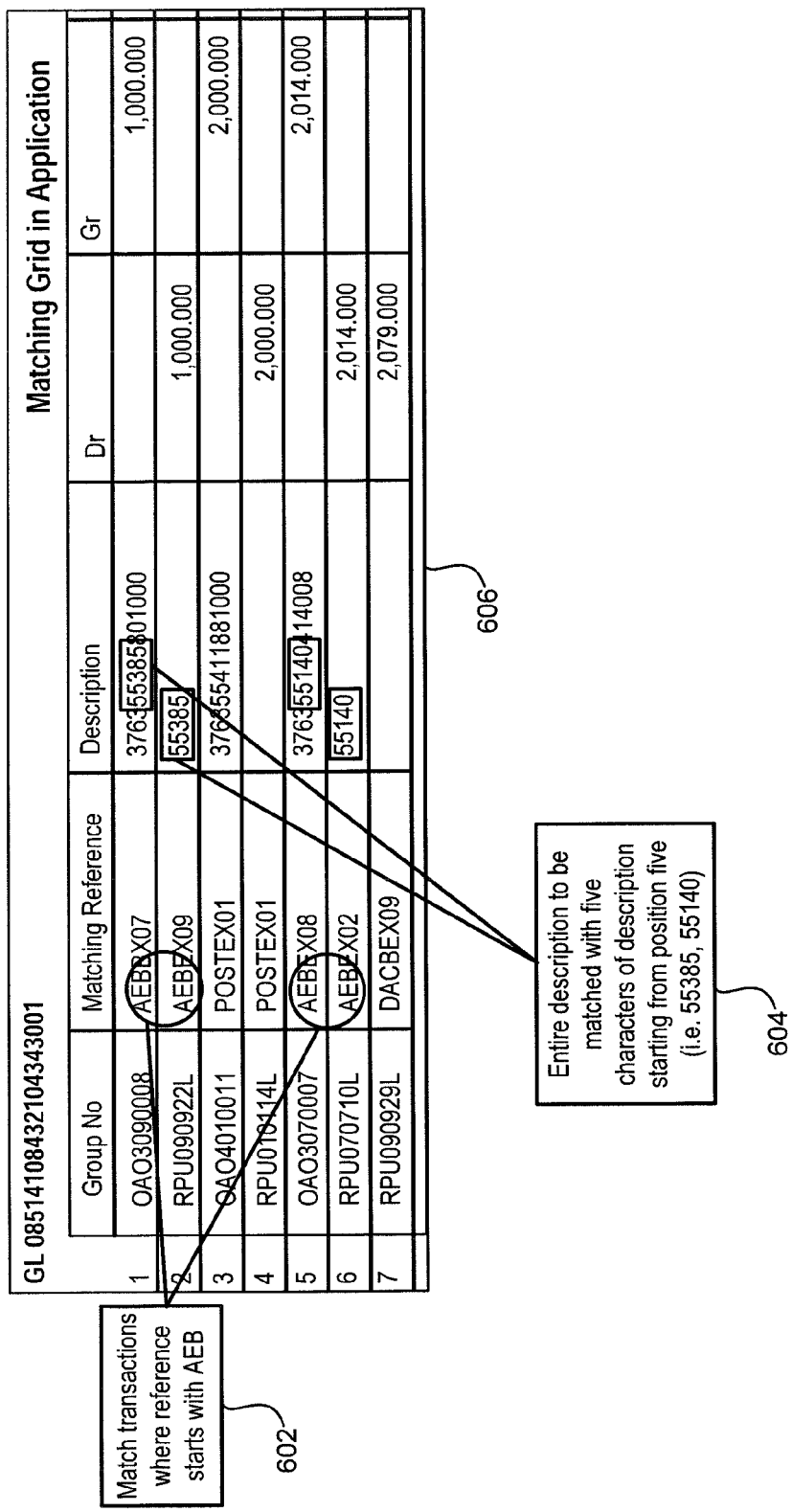
FIGS. 6a and 6b are exemplary screenshots illustrating a method to define an auto-match wizard using one or more substrings, in accordance with an embodiment of the present invention.
Figure 6B:
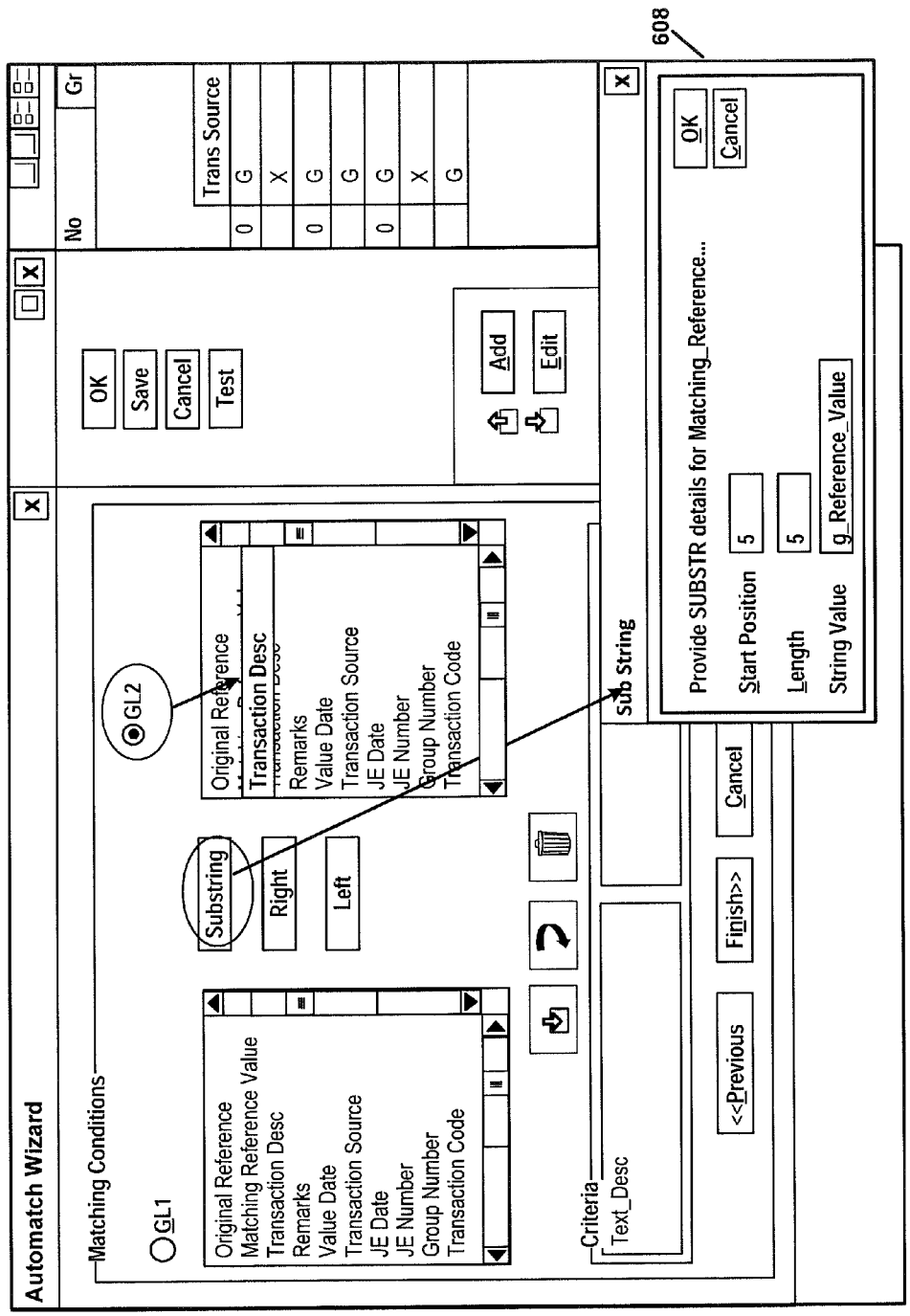

FIGS. 6a and 6b include exemplary screenshots illustrating a method to define an auto-match wizard using one or more substrings, in accordance with an embodiment of the present invention. FIG. 6a includes a section 602, a section 604, and a section 606. Section 602 indicates a filter criterion and its application in the auto-matching. For example, a filter criterion which provides screening of only the transactions having a reference starting with string AEB may be considered for auto-matching. Section 604 specifies a match condition for auto-matching. For example, the match condition may include a comparison of entire description of one transaction with five characters, starting from position five, with description of another transaction, as shown in FIG. 6a. Section 606 is an interface for illustrating a matching grid. The matching grid includes the captured transaction data such as group numbers, matching references, description, credit amounts, and the like.

FIG. 6b illustrates a process for using the substrings for performing the auto matching. In FIG. 6b, complete transaction data from general ledger 1 (GL1) is matched with a portion of the transaction data of general ledger 2 (GL2). Section 608 illustrates an interface for defining the substring for performing the matching as explained in conjunction with FIG. 6a.

Figure 7:
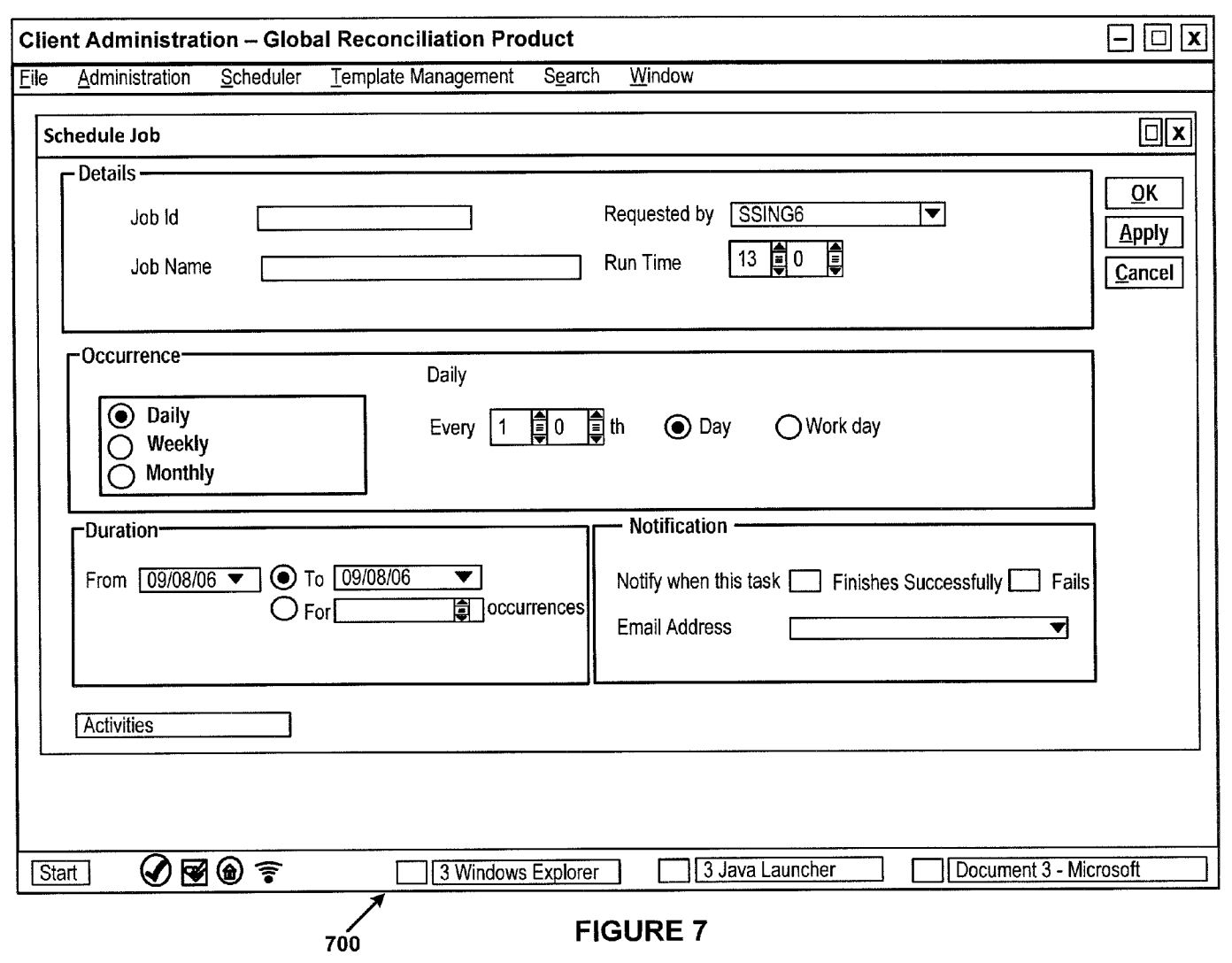

FIG. 7 is an exemplary screenshot illustrating a scheduler, in accordance with an embodiment of the present invention. The scheduler may be similar to the first scheduler and the second scheduler explained in conjunction with FIG. 1 and FIG. 2. The screenshot is used for scheduling, for example, the first set of data logics, the auto match logics, and the like, by specifying the required information fields such as job identification, job name, identification of the requesting user, run time, and the like. The screenshot also provides an option to specify desired occurrence of scheduling, for example, daily, weekly, and the like; duration of scheduling; notification to be provided when a scheduled task is completed successfully, notification to be provided when a scheduled task fails, email address for providing notifications, and the like.

IV. Example Implementations

The present invention (i.e., system 100, system 200, process 300, process 400 or any part(s) or function(s) thereof) may be implemented using hardware, software or a combination thereof, and may be implemented in one or more computer systems or other processing systems. However, the manipulations performed by the present invention were often referred to in terms, such as comparing or checking, which are commonly associated with mental operations performed by a human operator. No such capability of a human operator is necessary, or desirable in most cases, in any of the operations described herein, which form a part of the present invention. Rather, the operations are machine operations. Useful machines for performing the operations in the present invention may include general-purpose digital computers or similar devices.

Figure 8:
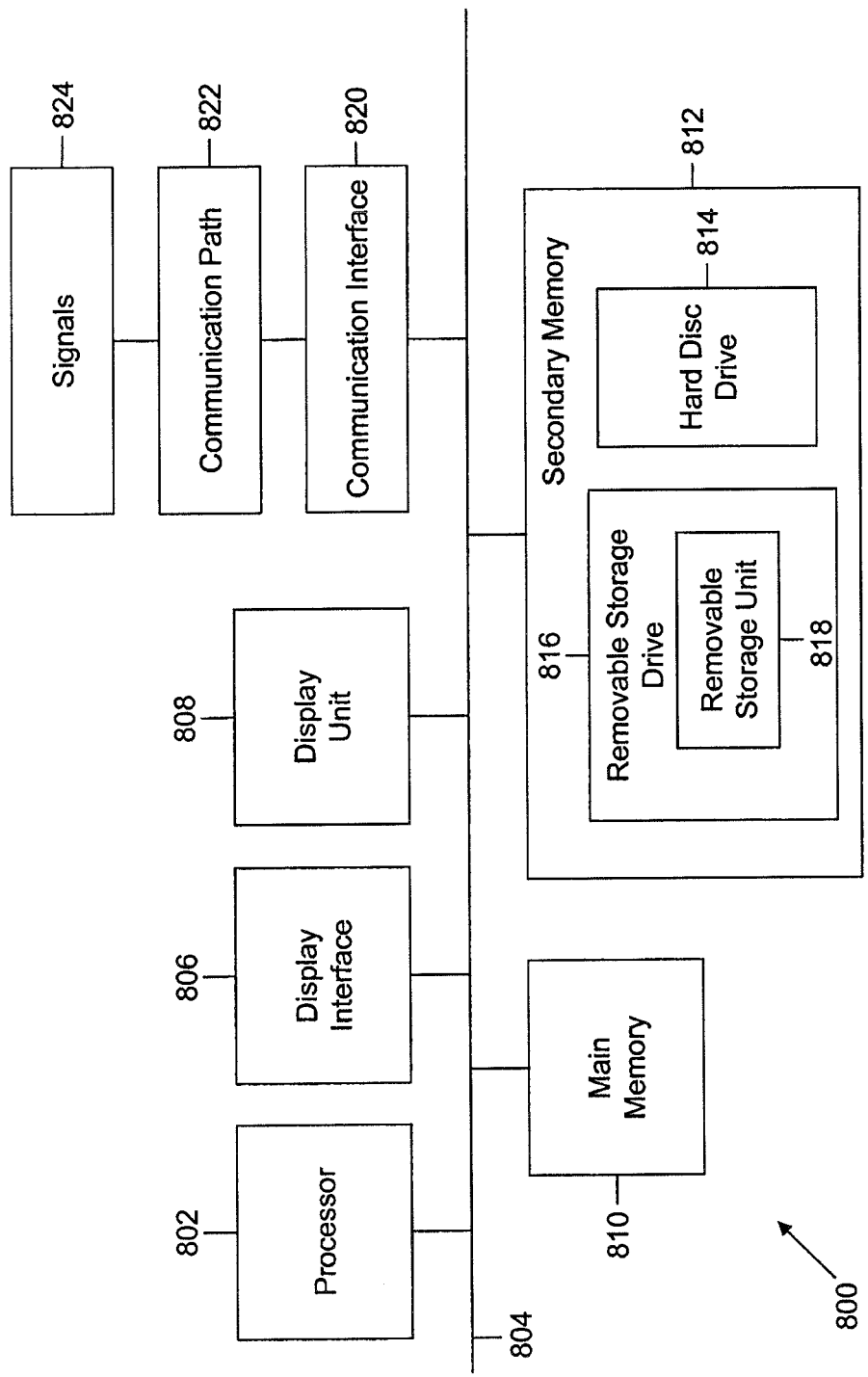
FIG. 8 is a block diagram of an exemplary computer system useful for implementing the present invention.

In fact, in accordance with an embodiment of the present invention, the present invention is directed towards one or more computer systems capable of carrying out the functionality described herein. An example of the computer systems includes a computer system 800, which is shown in FIG. 8.

Computer system 800 includes one or more processors, such as a processor 802. Processor 802 is connected to a communication infrastructure 804, for example, a communications bus, a cross over bar, a network, and the like. Various software embodiments are described in terms of this exemplary computer system 800. After reading this description, it will become apparent to a person skilled in the relevant art(s) how to implement the present invention using other computer systems and/or architectures.

Computer system 800 includes a display interface 806 that forwards graphics, text, and other data from communication infrastructure 804 (or from a frame buffer which is not shown in FIG. 8) for display on a display unit 808.

Computer system 800 also includes a main memory 810, such as random access memory (RAM), and may also include a secondary memory 812. Secondary memory 812 may include, for example, a hard disk drive 814 and/or a removable storage drive 816, representing a floppy disk drive, a magnetic tape drive, an optical disk drive, etc. Removable storage drive 816 reads from and/or writes to a removable storage unit 818 in a well known manner. Removable storage unit 818 represents a floppy disk, magnetic tape, optical disk, and the like. Removable storage unit 818 may be read by and written to by removable storage drive 816. As will be appreciated, removable storage unit 818 includes a computer usable storage medium having stored therein, computer software and/or data.

In accordance with various embodiments of the present invention, secondary memory 812 may include other similar devices for allowing computer programs or other instructions to be loaded into computer system 800. Such devices may include, for example, a removable storage unit such as removable storage unit 818, and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 818 to computer system 800.

Computer system 800 may also include a communication interface 820. Communication interface 820 allows software and data to be transferred between computer system 800 and external devices. Examples of communication interface 820 may include a modem, a network interface (such as an Ethernet card), a communications port, a Personal Computer Memory Card International Association (PCMCIA) slot and card, and the like. Software and data transferred via communication interface 820 are in the form of a plurality of signals, hereinafter referred to as signals 824, which may be electronic, electromagnetic, optical or other signals capable of being received by communication interface 820. Signals 824 are provided to communication interface 820 via a communication path (e.g., channel) 822. Communication path 822 carries signals 824 and may be implemented using wire or cable, fiber optics, a telephone line, a cellular link, a radio frequency (RF) link and other communication channels.

In this document, the terms "computer program medium" and "computer usable medium" are used to generally refer to media such as removable storage drive 816, a hard disk installed in hard disk drive 814, signals 824, and the like. These computer program products provide software to computer system 800. The present invention is directed to such computer program products.

Computer programs (also referred to as computer control logic) are stored in main memory 810 and/or secondary memory 812. Computer programs may also be received via communication interface 820. Such computer programs, when executed, enable computer system 800 to perform the features of the present invention, as discussed herein. In particular, the computer programs, when executed, enable processor 802 to perform the features of the present invention. Accordingly, such computer programs represent controllers of computer system 800.

In accordance with an embodiment of the present invention, where the present invention is implemented using software, the software may be stored in a computer program product and loaded into computer system 800 using removable storage drive 816, hard disc drive 814 or communication interface 820. The control logic (software), when executed by processor 802, causes processor 802 to perform the functions of the present invention as described herein.

In another embodiment, the present invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the present invention is implemented using a combination of both the hardware and the software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method comprising:
   creating, by a computer-based journal entry system, journal entries of transaction data based upon predefined journal entry criteria;
   distinguishing, by the computer-based journal entry system, the transaction data as closed transaction data, in response to the predefined journal entry criteria being executed; and
   archiving, by the computer-based journal entry system, the closed transaction data.

2. The method of claim 1, further comprising executing, by the computer-based journal entry system, the predefined journal entry criteria.

3. The method of claim 1, further comprising extracting, by the computer-based journal entry system and based upon data logic and validations, the transaction data from financial transactions, wherein the transaction data comprises a subset of the financial transactions.

4. The method of claim 1, further comprising transforming, by the computer-based journal entry system, the transaction data to a predefined format.

5. The method of claim 1, further comprising capturing, by the computer-based journal entry system, the transaction data in a reusable import template, wherein the reusable import template is created based up the transaction data.

6. The method of claim 1, further comprising auto-matching, by the computer-based journal entry system, the transaction data to master data to within a specified tolerance limit.

7. The method of claim 1, further comprising performing, by the computer-based journal entry system, research and clearance of the transaction data.

8. The method of claim 1, further comprising auto-matching, by the computer-based journal entry system, the transaction data to master data to within a specified tolerance limit by using one or more auto-match logics, the one or more auto-match logics comprising permutations of one or more arithmetic algorithms, the auto-matching providing open transaction data and being performed using a second set of validations.

9. The method of claim 1, further comprising:
   generating, by the computer-based journal entry system, one or more reports on auto-matched transaction data; and
   providing, by the computer-based journal entry system, user privileges according to a first predefined criterion, the user privileges for controlling capturing, the auto-matching, and generation of the one or more reports.

10. The method of claim 1, further comprising:
    scheduling, by the computer-based journal entry system, the data logic, the scheduling enabling automatic execution of the data logic according to a second predefined criterion.

11. The method of claim 1, further comprising scheduling, by the computer-based journal entry system, at auto-match logics, the scheduling enabling automatic execution of at least one of the auto-match logics according to a third predefined criterion.

12. The method of claim 1, further comprising performing, by the computer-based journal entry system, audit trails on at least one of captured transaction data, master data, auto-matched transaction data and reports.

13. The method of claim 1, further comprising auto-matching, by the computer-based journal entry system, the transaction data to master data, wherein the auto-matching is a tolerance auto-matching, the tolerance auto-matching comprising a predefined tolerance limit.

14. The method of claim 1, further comprising providing, by the computer-based journal entry system, views, the views for reviewing captured transaction data, uncaptured transaction data, auto-matched transaction data and reports.

15. The method of claim 1, further comprising auto-matching, by the computer-based journal entry system, the transaction data to master data, wherein the auto-matching further comprises splitting captured transaction data, the splitting being performed using auto-match logics.

16. A system comprising:
a processor configured for executing journal entry criteria;
a tangible, non-transitory memory configured to communicate with the processor,
the tangible, non-transitory memory having instructions stored thereon that, in response to execution by the processor, cause the processor to perform operations comprising:
creating, journal entries of transaction data based upon predefined journal entry criteria;
generating and testing data logic based on a plurality of desired fields, wherein the data logic comprises at least one of: an algorithm and a computer code;
distinguishing, the transaction data as closed transaction data, in response to the predefined journal entry criteria being executed; and
archiving, the closed transaction data.

17. An article of manufacture including a non-transitory, computer readable storage medium having instructions stored thereon that, in response to execution by a computer-based journal entry system, cause the computer-based journal entry system to perform operations comprising:
creating, by the computer-based journal entry system, journal entries of transaction data based upon predefined journal entry criteria;
generating, by the computer-based journal entry system, a data logic based upon a plurality of desired fields;
testing, by the computer-based journal entry system, the data logic; and
scheduling, by the computer-based journal entry system, the data logic, the scheduling enabling automatic execution of the data logic according to a predefined criterion;
distinguishing, by the computer-based journal entry system, the transaction data as closed transaction data, in response to the predefined journal entry criteria being executed; and
archiving, by the computer-based journal entry system, the closed transaction data.

* * * * *